United States Patent [19]
Arnold et al.

[11] Patent Number: 6,032,151
[45] Date of Patent: *Feb. 29, 2000

[54] DATABASE SYSTEM EMPLOYING POLYMORPHIC ENTRY AND ENTRY MATCHING

[75] Inventors: Kenneth C. R. C. Arnold, Lexington; James H. Waldo, Dracut; Roger Riggs, Burlington; Ann M. Wollrath, Groton; Peter Jones, Winchester, all of Mass.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/971,529

[22] Filed: Nov. 17, 1997

[51] Int. Cl.⁷ .................................................. G06F 17/30
[52] U.S. Cl. ............................. 707/103; 707/3; 707/102
[58] Field of Search .................................. 707/103, 101, 707/102, 100, 104, 1–4, 505–508

[56] References Cited

U.S. PATENT DOCUMENTS

| | | | |
|---|---|---|---|
| 5,657,259 | 8/1997 | Davis et al. | 707/103 |
| 5,822,580 | 1/1996 | Leung | 707/103 |

OTHER PUBLICATIONS

"Object Data Management, Revised Edition, Object–Oriented and Extended Relational Database Systems," R.G.G. Cattell, Sun Microsystems, Inc. Addison–Wesley Publishing Company, 1994, Chapter 4—Object Management Concepts, Section 4.6.1—Types, pp. 110–116, Aug. 1994.

"How to Write Parallel Programs: A Guide to the Perplexed," Nicholas Carriero and David Gelernter, ACM Computing Surveys, Sep. 1989.

"Generative Communication in Linda," David Gerlenter, ACM Transactions on Programming Languages and Systems, Vol. 7, No. 1, pp. 80–112 (Jan. 1995).

*Primary Examiner*—Thomas G. Black
*Assistant Examiner*—Hosain T. Alam
*Attorney, Agent, or Firm*—Conley, Rose & Tayon, PC; B. Noel Kivlin

[57] ABSTRACT

A database system wherein one or more entry databases store a plurality of entries. Each entry is of a given type that defines the fields of the entry. Each of the fields contains or identifies an object with associated attributes or data. The type of each entry may further define behavior in the form of methods the entry is configured to implement. An entry type which is a subtype of another inherits all of the fields and behavior of its supertype, and contains additional fields and/or defines new/modified behavior. Entries may be expressed in a Java™ class of the Java™ programming language. The database system may further employ a search engine which allows queries to be made upon entries in the database. In one implementation, the queries include a read operation, a take operation, and a notify operation. Each query request includes a command indicating the type of operation, and a template which is an entry object having some or all of its fields set to specified values that must be matched exactly. Other fields of the template entry may be specified as wildcards, whose values do not matter. The search engine may further be configured to create an index for entries having characteristics which are commonly specified by queries. Thus, the search engine may detect a pattern of usage and create an index which points to entries having attributes which are commonly specified by received templates. In this manner, expedient entry searching may be accommodated.

21 Claims, 8 Drawing Sheets

Write: [entry]

Read: [template]

Take: [template]

Notify: [template]

DATABASE SYSTEM EMPLOYING POLYMORPHIC ENTRY AND ENTRY MATCHING

BACKGROUND OF THE INVENTION

1. Field of the Invention

This invention relates to database systems and, more particularly, to entry storage in database systems. The invention also relates to query matching methodologies employed in database systems.

2. Description of the Related Art

Database systems are serving increasingly important roles in today's society. The amount of data which may be stored by typical database systems is growing at staggering rates, and providing expedient and flexible access to the data is often vital. However, the job of designing database systems which perform in an optimal manner is difficult.

A particularly important consideration in database design is to store the data so that it can be used for a wide variety of applications and such that the manner in which it may be used can be changed quickly and easily. It is further often desirable to allow additional data types or categories to be added without significantly affecting other portions of the database system.

Unfortunately, it is remarkably difficult to change the way data is used and organized in many database systems, and to allow for additional data types and categories. Modifications can set off a chain reaction of changes to programs and other components of the database system, and hence can be exceedingly expensive to accomplish. Consequently, data processing has tended to become frozen into its old data structures. Additionally, designers of database systems tend to make numerous intricate trade-offs between one aspect of the design and another, thus leading to a less than optimal resulting design.

To elaborate further, storing information in a database system is usually done by exact type; that is, a record stored in a database system typically has a certain number and type of fields, such as a tuple in a relation of a relational database. Each field may be defined to store a particular type of data, such as string data, integer data, boolean data, or some other data type, as desired. If a user wants to look-up information in the database, the user must look-up the exact record type (i.e., records of different types are typically searched independently). Thus, if data in which the searcher is interested may be in a record of any one of several different types, the searcher must know in advance which record types might exist, or have some explicit way of asking for all types. The searcher is then required to explicitly look through all possible record types to find the particular record of interest. This complicates the software associated with the search engine, and can practically limit the number of different record types that can be maintained.

In addition, a record in a typical database is usually not associated with characteristics apart from the actual data itself. For example, when data is found, there is no way to associate behavior with the record that changes with the record type, thus allowing the program to use various records returned by the match in a single way to achieve record-type specific results.

It is desirable to provide a database system allowing for polymorphic entry and entry matching to thereby allow more efficient searching and to allow simplified software implementation where many different types exist. It would further be desirable to provide a system where entries may define their own behavior according to type.

SUMMARY OF THE INVENTION

The problems outlined above are in large part solved by a method and system for storing and searching entries in a database in accordance with the present invention. In one embodiment, a computer system implements a database system wherein one or more entry databases store a plurality of entries. Each entry is of a given type that defines the fields of the entry. Each of the fields contains or identifies an object with associated attributes or data. The type of each entry may further define behavior in the form of methods the entry is configured to implement. An entry type which is a subtype of another inherits all of the fields and behavior of its supertype, and contains additional fields and/or defines new/modified behavior. Entries may be expressed in a Java™ class of the Java™ programming language. Similarly, in one implementation each field is expressed in a defined class.

The database system may further employ a search engine which allows queries to be made upon entries in the database. In one implementation, the queries include a read operation, a take operation, and a notify operation. Each query request includes a command indicating the type of operation, and a template which is an entry object having some or all of its fields set to specified values that must be matched exactly. Other fields of the template entry may be specified as wildcards, whose values do not matter. The polymorphic entry and entry matching technique advantageously allows a query to be made which might result in a match of an entry which is the same type as the template entry or which is a subtype of the template entry. This allows for efficient searching and for simplified implementations of the search engine. Furthermore, the search engine need not be aware of all possible subtypes which might exist. Finally, since each entry has an associated class, an entry may define its own behavior by supporting one or more methods. A method of a particular entry may be invoked by a program to implement various functionality, such as equivalence checking.

The search engine may further be configured to create an index for entries having characteristics which are commonly specified by queries. That is, the search engine may detect a pattern of usage and create an index which points to entries having attributes which are commonly specified by received templates. In this manner, expedient entry searching may be accommodated.

BRIEF DESCRIPTION OF THE DRAWINGS

Other objects and advantages of the invention will become apparent upon reading the following detailed description and upon reference to the accompanying drawings in which:

FIG. 3 further illustrates an entry which is a subtype of another entry.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
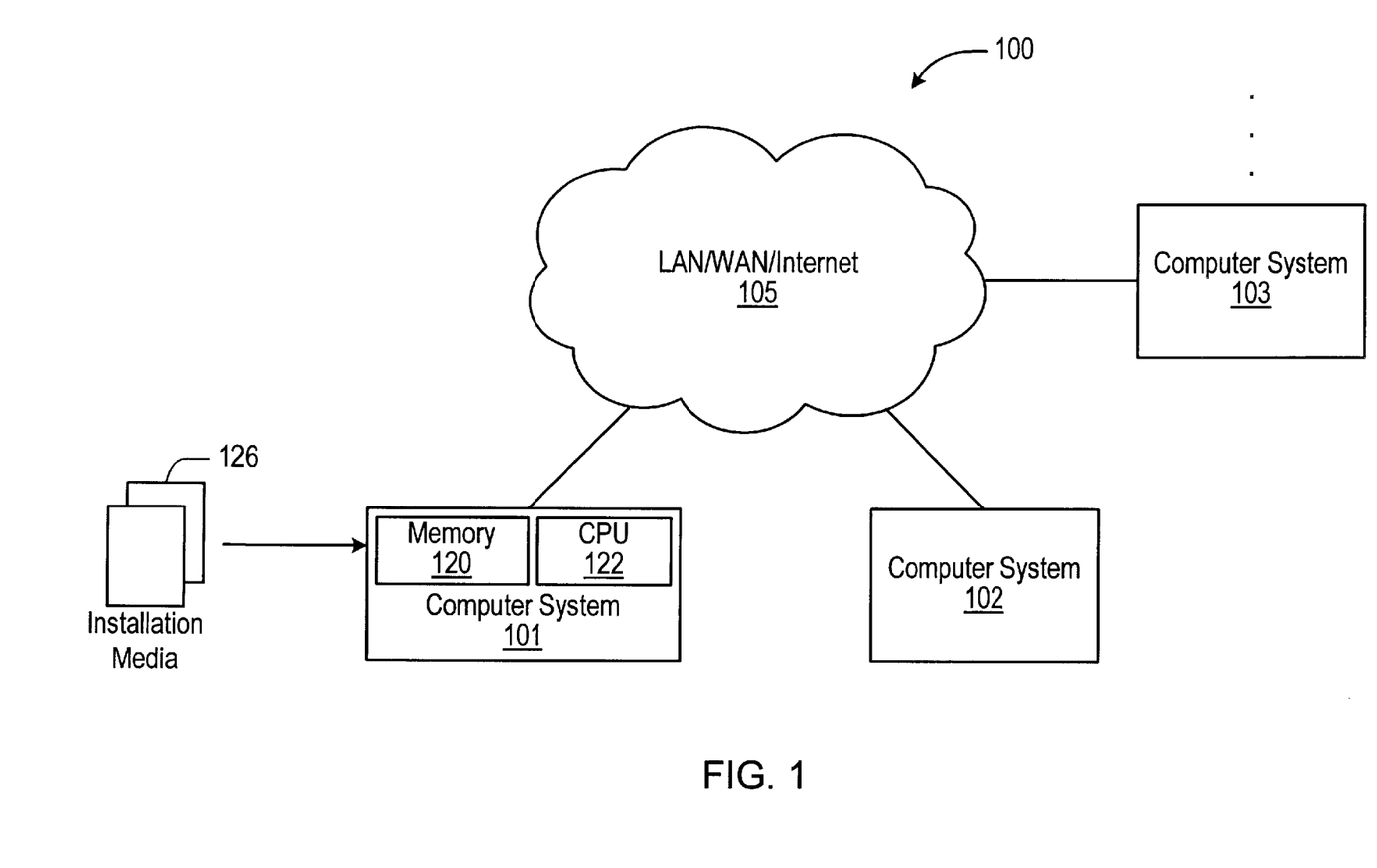
FIG. 1 is a diagram of a distributed computer system employing a database system in accordance with one embodiment of the invention.

Turning now to the drawings, FIG. 1 is a diagram illustrating a distributed system 100 in which polymorphic entry and entry matching in accordance with the present invention may be employed. FIG. 1 shows a plurality of computer systems 101–103 interconnected by a network 105. Network 105 is illustrative of, for example, a local area network (LAN), a wide area network (WAN), or the Internet, among a variety of other possible communication channels. Each computer system includes a memory and a microprocessor such as the exemplary memory 120 and CPU 122 of computer system 101. Memory 120 is representative of various types of possible memory, such as hard disk storage, floppy storage, and dynamic random access memory (DRAM). Installation media 126, which is illustrative of one or more CD ROMs or floppy disks (or other storage media), is further shown in association with computer system 101. Generally speaking, installation media 126 may store code and/or data which implements portions of the search engine and other aspects of the database system described below, and may be utilized to install the code and/or data within a particular computer system. It is noted that in other embodiments, a database system in accordance with the invention may be implemented within a single, non-networked computer system.

As will be described in further detail below, computer system 100 implements a database system wherein object oriented techniques are utilized to store entries of possible types or subtypes. Entries of the database may be stored solely within memory 122 of computer system 101, or may be distributed across the memories of several different systems, such as memory 122 and similar memories of computer systems 102 and 103. Each entry is of a given type that defines the fields of the entry. Each of the fields contains or identifies an object with associated attributes or data. The type of each entry may further define behavior in the form of methods the entry is configured to implement. An entry type which is a subtype of another inherits all of the fields and behavior of its supertype, and contains additional fields and/or defines new/modified behavior.

The database system further employs a search engine, which may be implemented in software, which allows queries to be made upon entries in the database. In one implementation, each query includes a template that specifies the values (or attributes) of the key fields of a given entry which must match corresponding fields of the template to result in a successful match. Other fields of the template entry may be specified as wildcards, whose values do not matter. The polymorphic entry and entry matching technique employed by computer system 100 advantageously allows a query to be made which might result in a match of an entry which is the same type as the template entry or which is a subtype of the template entry. Additional details regarding aspects of the polymorphic entry and entry matching technique are provided further below in conjunction with FIGS. 2–9.

Figure 2:
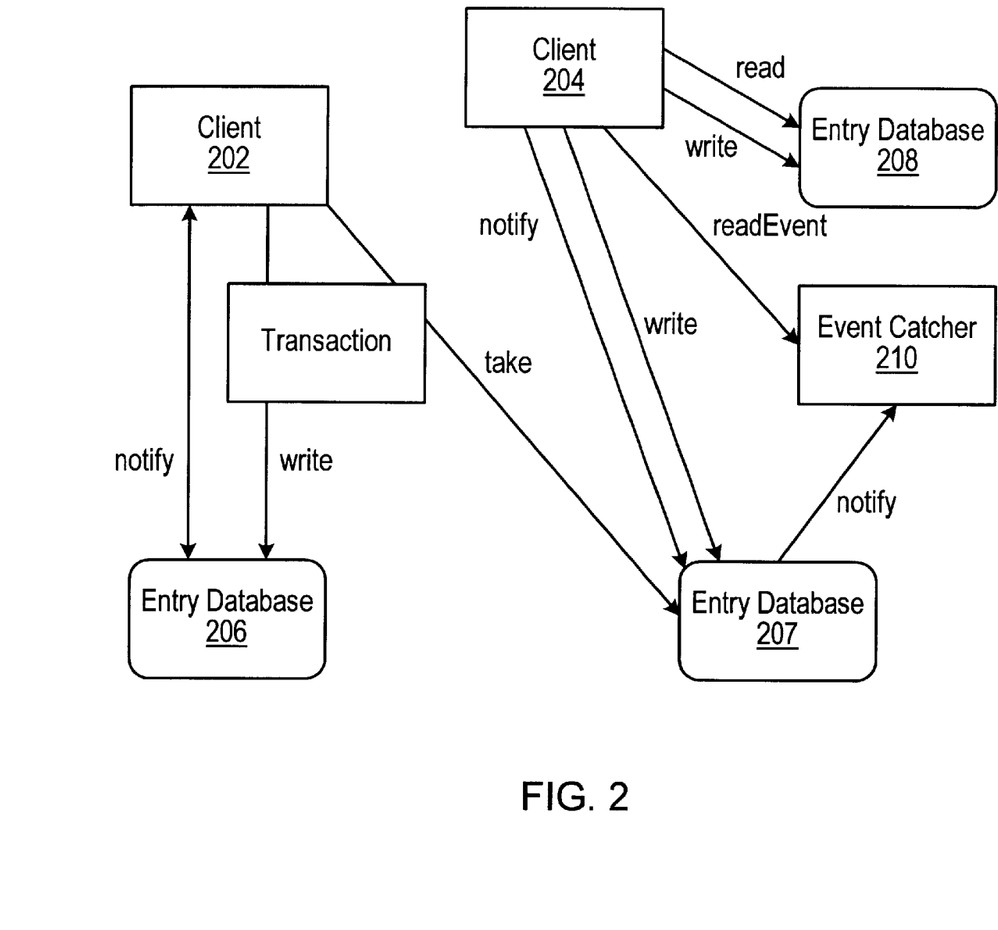
FIG. 2 is a diagram illustrating exemplary communication between a plurality of clients and a plurality of entry databases.

FIG. 2 is a diagram illustrating exemplary communication flow between a pair of clients (or users) 202 and 204 and a plurality of entry databases 206–208. Each of the entry databases 206–208 may be distributed across one or more memory subsystems of distributed system 100. Each client 202 and 204 is configured to generate queries which may be provided to one or more of the entry databases 206–208. Clients 202 and 204 may further be configured to store (write) entries within entry databases 206–208, as discussed further below. FIG. 2 finally illustrates an event catcher 210, the functionality of which will also be described further below.

Figure 3:
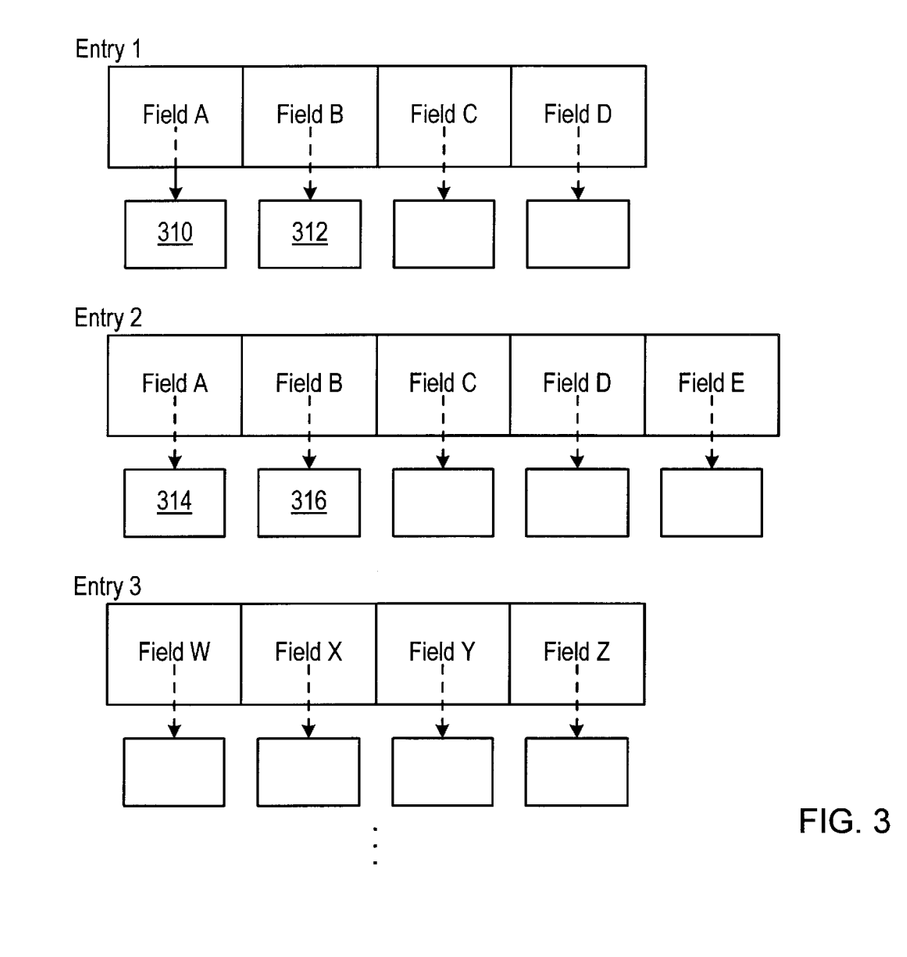
FIG. 3 is a diagram illustrating several entries each including fields of particular types.

FIG. 3 is a diagram illustrating a plurality of exemplary entries which may be stored in any of entry databases 206–208. In one implementation, each entry is a typed group of objects, expressed in a Java™ class of the Java™ programming language. It is understood, however, that in other embodiments, entries may be defined in classes of other programming languages.

Entry 1 of FIG. 3 illustratively includes a set of four fields (field A, field B, field C and field D) which are defined by the class type of entry 1. Entry 2 includes a set of five fields (field A, field B, field C, field D and field E) which are defined by the class type of entry 2. It is noted that entry 2 is a subtype of the type of entry 1, since entry 2 contains the same field types as entry 1, in addition to others.

Entry 3 includes a set of four fields (field W, field X, field Y and field Z) defined by the class type of entry 3. It is noted that while entries 1 and 3 each contain four fields, they represent different types since their field types are not identical.

Numerous other types and subtypes may further be associated with the database system, as desired depending upon the requirements of a particular application or database. Additionally, it is noted that entries are possible which are subtypes of subtypes. For purposes of example only, the following code is illustrative of specific exemplary entries defined in the Java™ programming language:

```
/**
 *A "Request For Bid" object for book buying.
 *
 * @author Ken Arnold
 *
 * @see FullRFB
 */
public class RFB implements com.sun.jini.jiniSpace.Entry {
    /**
     * The buyer's tracking number for this order.
     */
    public Integer    orderNumber;
    /**
     * The title of the book.
     */
    public String    title;
    /**
     * The number of copies desired.
     */
    public Integer    count;
```

```
                            -continued

//!! Remove this -- replace by a generic one in Entry using
    reflexive API public String toString() {
        return
            orderNumber + ":" + title + "(" + count + ")";
    }
}
------------------------------------------------------------------------
/**
 * A "Full" request for bids, that is, one that includes the ISBN.
 *
 * @author Ken Arnold
 */
public class FullRFB extends RFB {
    /**
     * The ISBN field. This is a <code>String</code>because ISBNs can
     * have non-numeric characters.
     */
    public String    isbn;
    //!! Remove this -- replace by a generic one in Entry using
    reflexive API public String toString() {
        return
            orderNumber + ":ISBN" + isbn + ":" + title + "(" +
            count + "
        )";
    }
}
```

Referring again to FIG. 3, each of the fields of the entries are configured to store values which point to or identify typed objects. Each of these typed objects may similarly be expressed in a Java™ class. For example, field A of entry 1 contains a value identifying object 310, and field B of entry 1 identifies an object 312. Similarly, field A of entry 2 identifies an object 314, and field B identifies an object 316, and so on. It is noted that for the exemplary entries of FIG. 3, since entry 2 is a subtype of entry 1, the object 310 associated with field A of entry 1 is expressed by the same class type as that of the object 314 associated with field A of entry 2. The attributes or data associated with each of the objects 310 and 314, however, may differ. It is further noted that the objects identified by the fields of the various entries may contain integer data, boolean data, string data, or other data types, as desired, depending upon the defined type. Still further, it is noted that since each field is associated with a typed object, methods may be supported and selectively invoked via external stimuli to perform operations upon the data, as desired. Similarly, each entry type may support one or more methods, as described further below.

Referring back to FIG. 2, as described previously, each of the entry databases 206, 207 and 208 may store numerous entries of various types and subtypes. An entry may be stored within a given entry database 206–208 through a write operation invoked by a client. Entries may additionally be provided to an entry database via an installation media (e.g., installation media 126 of FIG. 1).

Figure 4:
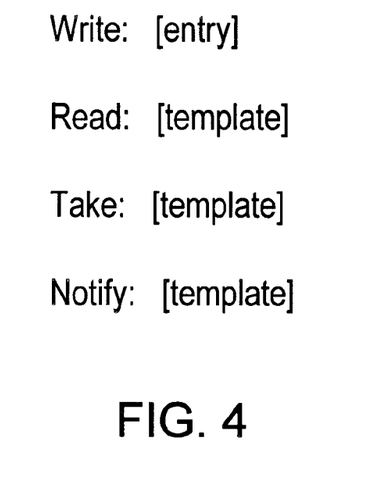
FIG. 4 is a diagram illustrating various operations supported by a database system.

Several additional operations are further supported by the system, as illustrated by FIG. 4. Specifically in addition to write operations, a client or user may initiate "read" operations, "take" operations, and "notify" operations.

Read, take, and notify operations are each used to query a particular entry database to determine whether an entry with certain specified characteristics has been written into an entry database and, if so, to cause a specific action. In one particular implementation, these queries are made through the use of templates included as part of the operation requests which define the type of entries which are of interest with respect to the operation. A read operation may be initiated to read an entry in an entry database which matches an associated template. A take operation is similar to a read; however, a take operation will remove an entry matching the template from the entry database. Finally, a notify operation registers interest in future incoming entries of a specified entry database that match the associated template. When matching entries arrive, the client or a specified event catcher is notified. Further details regarding each of these operations will be provided further below.

Figure 5:
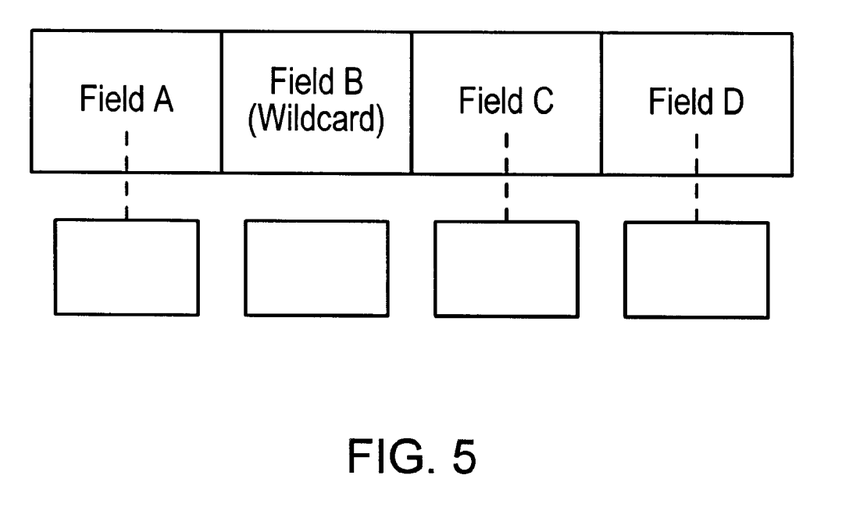
FIG. 5 is a diagram illustrating an exemplary template entry.

FIG. 5 depicts an exemplary template. Generally speaking, a template specifies a particular entry type whose fields can either have values (references to objects) or "wildcards". When considering a particular entry in an entry database as a potential match against a template, the attributes of specified fields (i.e., those which do not correspond to wildcarded fields of the template) of the entry must exactly match the attributes (or fall within a range of possible attributes) specified by the corresponding field of the template. Fields of an entry which correspond to "wildcard" fields of the template may have any attributes and do not affect the matching outcome (i.e., wildcards in the template match any value in the same field of an entry). In one implementation, a wildcard is specified with a null reference value. As will be described further below, the type of an entry which matches a template may be a subtype of the type of the template. Thus, all fields of a particular entry which are defined by the subtype are considered to be wildcards. This enables a template to match entries of any subtype. It is noted that an entry having no wildcards may further be a valid template.

Figure 6:
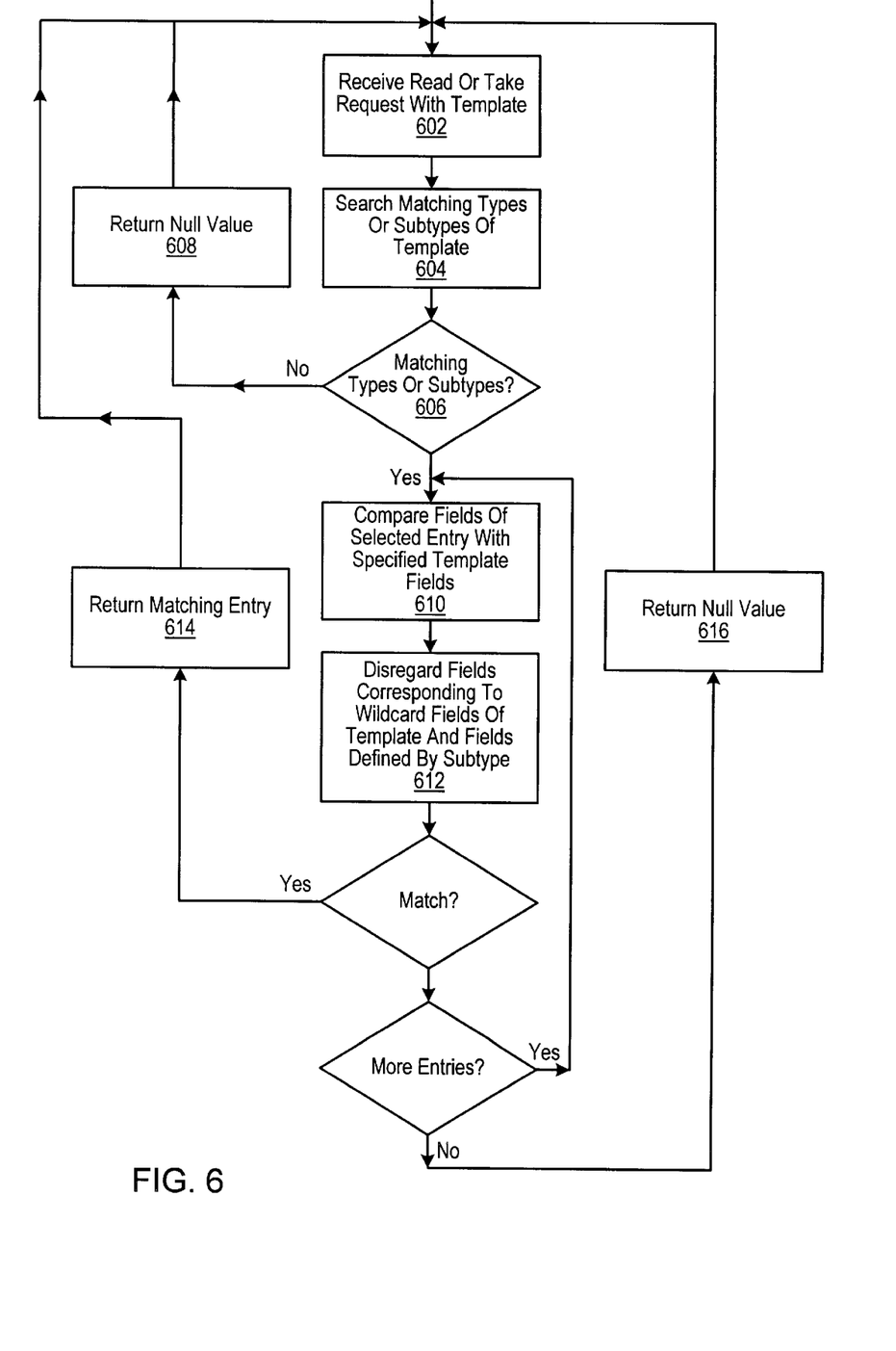
FIG. 6 is a flow diagram which depicts one implementation of a method for searching entries within a particular entry database in response to either a read request or a take request.

FIG. 6 is a flow chart which depicts one implementation of a method for searching entries within a particular entry database in response to either a read request or a take request. As stated previously, a read request may be initiated by a client (or user) to read an entry that matches a given template. A take request may be initiated to remove an entry matching the given template from an entry database.

The steps illustrated in FIG. 6 will be described in conjunction with FIG. 7, which depicts functional aspects of a database system employing the search methodology of FIG. 6. The functional components of FIG. 7 may be implemented through a combination of software and hardware associated with one or more of the computer systems 101–103 of FIG. 1. During step 602, a read or take request is provided from a user 702 to a database manager 704. A given request will include a specified template, an exemplary one of which is shown as template 706 in FIG. 7. A search engine 708 of database manager 704 subsequently searches entry database 710 during step 604 to determine if any matching types or subtypes of the template reside within entry database 710. If no entries within entry database 710 are of the same type or a subtype of the template (step 606), database manager 704 returns a null value to user 702 during step 608.

If search engine 708 determines that there are one or more entries within entry database 710 that are matching types or subtypes of the template, search engine 708 compares the fields of a selected entry (of the same type or a subtype) with the corresponding fields of template 706 which are not designated as wildcards (step 610). Search engine 708 disregards any fields of the selected entry which correspond to a wildcard field of the template (step 612). In one specific implementation, search engine 708 determines whether the attributes or data associated with each non-wildcarded field of an entry exactly matches the attributes or data of the corresponding template entries. If the attributes of any field which is not a wildcard field do not exactly match those of the template, it is determined that a match with respect to that entry has not occurred. It is noted that in other embodiments, a field of the template may specify a range of values (rather than requiring an exact match) in which the data of a corresponding field must fall to result in a match.

Figure 7:
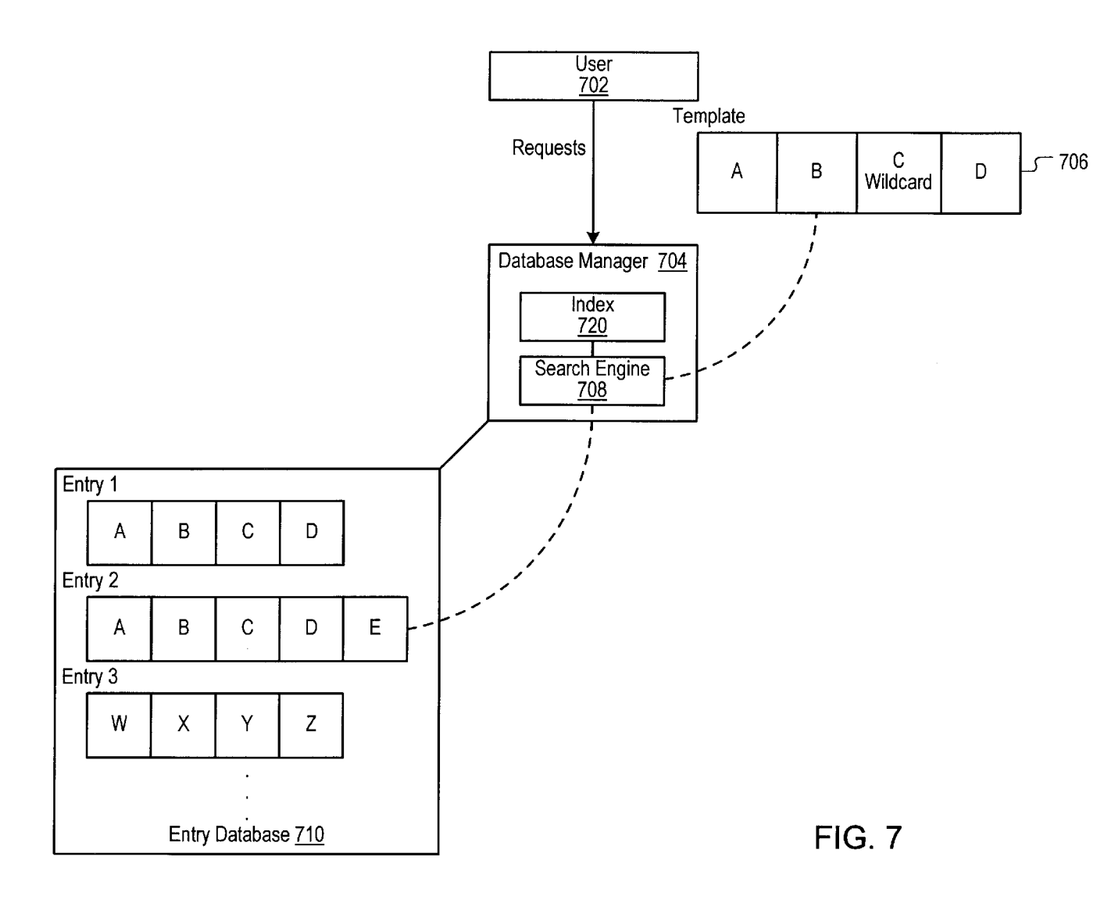
FIG. 7 is a functional block diagram illustrating aspects of a database system.

In the example illustrated by FIG. 7, field C of template 706 is specified as a wildcard. Thus, when search engine 708 searches entry database 710 for a matching entry, search engine 708 first determines whether any entries reside within the entry database 710 which are types or subtypes of the template 706. As shown, both entry 1 and entry 2 meet this qualification. Search engine 708 then selects one of these entries (such as entry 2, as depicted) and compares the fields of the entry to the fields of the template which are not specified as wildcards. Search engine 708 determines whether an exact match for each of the non-wildcarded fields of the template occurs with respect to the attributes of each of the corresponding fields of the entry. It is noted that since field C of the template 706 of FIG. 7 is designated as a wildcard field, the attributes of field C of entry 2 are disregarded and do not affect the comparison operation. Similarly, those fields of any entry defined by a subtype of the template type are disregarded (i.e., a match may still occur even though the attributes of the wildcarded fields do not match). If a matching entry is found (all non-wildcarded fields match), search engine 708 either reads the matching entry from the entry database 710 and provides it to the user, or removes the entry from entry database 710, depending upon whether the request was a read request or a take request. Search engine searches entry database 710 until either a match is found or until all of the entries have been checked. If no matching entries are found after a search of all entries in the database, database manager 704 returns a null value (step 616) to user 702.

Figure 8:
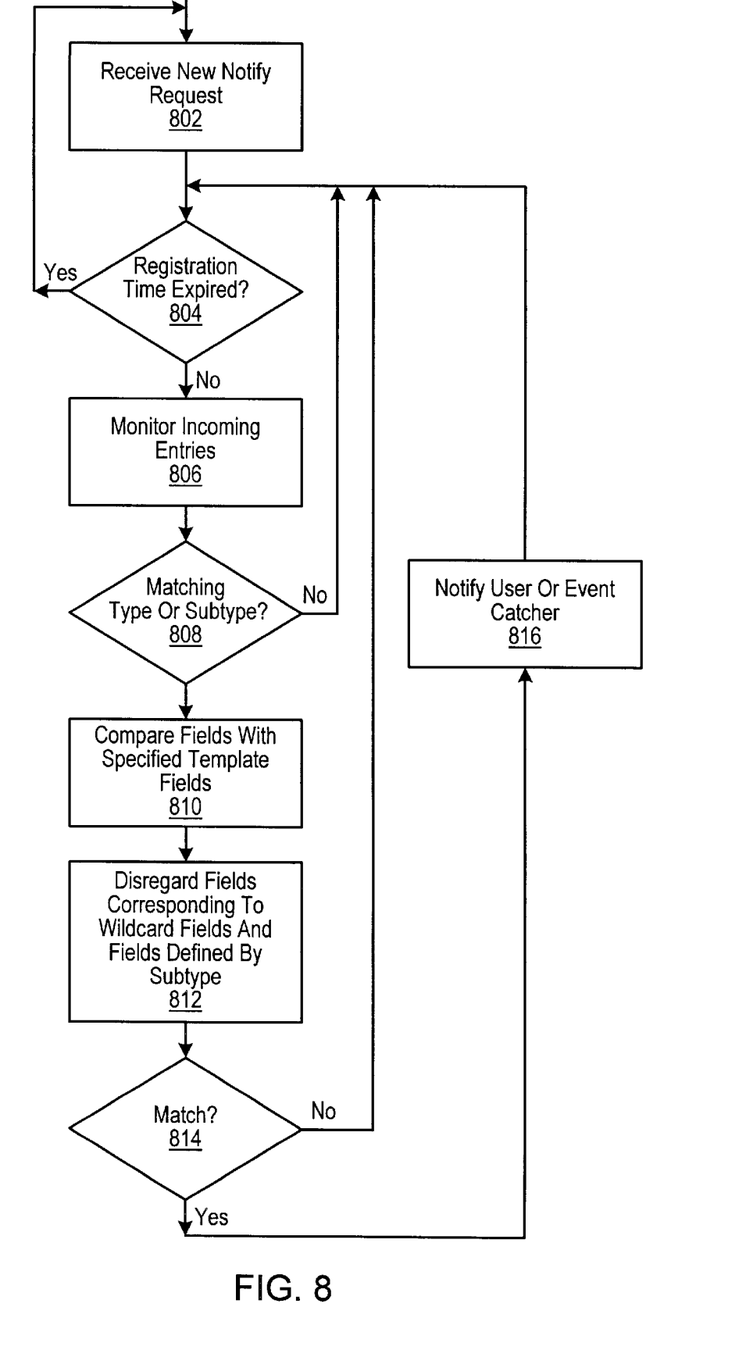
FIG. 8 is a flow diagram which illustrates an implementation of a search methodology to process a notify request.

Turning next to FIG. 8, a flow diagram is shown which illustrates one implementation of a methodology implemented by search engine 708 to process a notify request received from a user. As stated previously, a notify request may be issued by the user to register interest in future incoming entries which match a template. When matching entries arrive, the database manager either notifies the user or an event catcher (FIG. 2), as desired. When a user invokes a notify request, a lease time is specified which indicates how long the database manager 704 will register the notification. After the specified time has elapsed, the notify registration is canceled.

Thus, as depicted in FIG. 8, when database manager 704 receives a new notify request (step 802), incoming entries are monitored until the registration time expires (steps 804 and 806). If an entry is written into entry database 710 which is a type or a subtype of the template (step 808), the fields of the entry are compared to determine whether their attributes match the attributes associated with the non-wildcard fields of the template (step 810). Similar to the previous discussion, fields of an incoming entry which are wildcarded or which are defined by a subtype of the template entry are disregarded (step 812). If a match occurs, the user or an event catcher is notified (steps 814 and 816). Additional incoming entries continue to be monitored as long as the registration time has not expired.

Turning back to FIG. 7, search engine 708 may further be configured to create an index for entries having characteristics which are commonly specified by queries received by database manager 704. That is, search engine 708 may detect a pattern of usage and create an index 720 which points to entries having attributes which are commonly specified by received templates. As an example, consider a situation in which database manager 704 receives several query requests each using templates which are of the same type or a subtype of the template 706 illustrated in FIG. 7. In this situation, search engine 708 may detect that the same attribute value for field A (such as an integer value 1,000), is specified in each of the templates of the numerous requests. In one implementation, database manager 704 is configured to detect such a common template usage specified by many queries, and to responsively create an index 720 which points to all entries within entry database 710 which are the same type or a subtype of the commonly received template and which all have the common attribute specified for field A. Consequently, when a new query with a similar template is received (that is, a template which again specifies the value 1,000 for field A), search engine 708 may use index 720 to quickly locate the subset of entries which might match the template, without searching through the entire set of entries in the database.

Figure 9A:
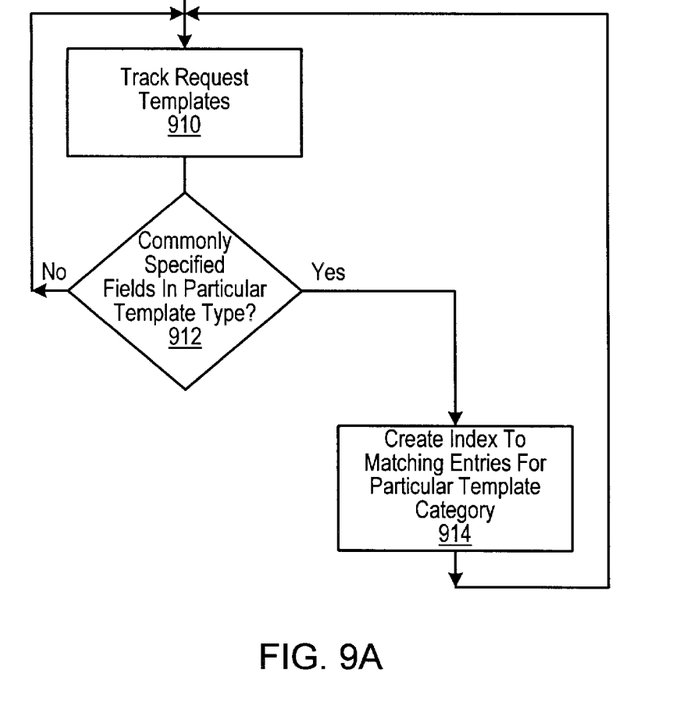
FIGS. 9A and 9B depict an implementation of an indexing methodology.
Figure 9B:
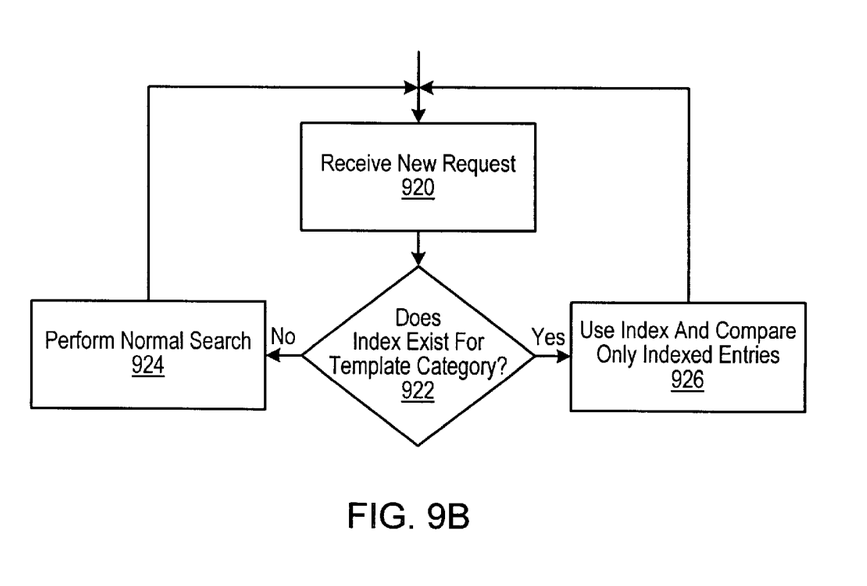

An implementation of the indexing methodology is illustrated in FIGS. 9A and 9B. As illustrated in FIG. 9A, an index to entries corresponding to a particular template category may be created by tracking request templates (step 910) and determining if there is a pattern associated with the templates (e.g., templates in which a particular non-wildcarded field (or fields) is specified with the same attribute or value (step 112). This determination may be made, for example, based on receiving a predetermined number of queries within a particular time which have similar templates, or based upon receiving a certain percentage of queries which have similar templates. When search engine 708 detects common template usage pattern, it creates an index to the entries which are of the particular template category (step 914). Thus, considering the above example, search engine 708 may create an index to all entries of the same type or subtype as template 706 with field A value of 1,000.

As depicted in FIG. 9B, if a new request is received during step 920, a normal search is performed if an index does not exist for that particular template category (steps 922 and 924). If an index category exists for the template of the new request, the index is used to find the subset of potentially matching entries and compares only those entries. In this manner, expedient entry searching may be accommodated. It is noted that search engine 708 may subsequently delete certain indexes if the common usage is no longer detected, as desired.

As stated previously, an entry type may further define a method which may be invoked by external stimuli (e.g., a software program associated with the database system that processes the entries) to cause a specific action to occur. Such specific actions might affect data residing in the entry. In addition, a method may be utilized to allow efficient equivalence checking to determine if a particular entry is equivalent to another (or equivalent to a template), even though the form of the data may be different. For example, an entry that stores decompressed video data might be considered an equivalent to another entry storing a compressed form of the video data. A method may be provided to determine such entry equivalence, even though the actual stored data is different (e.g., a method may be invoked to determine whether the objects refer to the same underlying pathname in the file system associated with the image).

It is further noted that entries may be stored in an implementation-specific representation that includes a serialized form of an entry's class and each of the entry's fields. Serialized forms of a template may then be compared against the serialized forms of the entries. It is finally noted that an entry may be specified by the field of another entry.

Numerous variations and modifications will become apparent to those skilled in the art once the above disclosure is fully appreciated. It is intended that the following claims be interpreted to embrace all such variations and modifications.

What is claimed is:

1. A method for searching entries in a database, wherein the database stores a plurality of entries, wherein each of said entries comprises a class type and includes a plurality of typed fields, and wherein at least one entry is a sub-type of a type of another entry, the method comprising:

receiving a template entry of a particular type, wherein said template entry includes a plurality of template entry fields, wherein one or more of said template entry fields comprises at least one search parameter;

comparing said template entry with one or more of said plurality of entries, wherein said comparing comprises comparing said one or more of said template entry fields in said template entry with corresponding fields of said one or more of said plurality of entries;

determining if said template entry matches one or more of said plurality of entries in response to said comparing, wherein said determining includes determining if an entry comprising a sub-type of said particular type matches said template entry;

returning a matching entry in said database in response to said determining.

2. The method for searching entries in a database as recited in claim 1 wherein said at least one search parameter comprises a range of specified values.

3. The method for searching entries in a database as recited in claim 1 wherein said at least one search parameter comprises a specific value.

4. The method for searching entries in a database as recited in claim 1 wherein said plurality of template entry fields comprises a wildcard field.

5. The method for searching entries in a database as recited in claim 4 wherein said wildcard field stores a null value.

6. The method for searching entries in a database as recited in claim 1 wherein said comparing said template entry with said one or more of said plurality of entries includes comparing fields of only those entries which are of said particular type or which are a subtype of said particular type with said one or more template entry fields.

7. The method for searching entries in a database as recited in claim 1 wherein each of said typed fields of said plurality of entries stores a value identifying a stored object.

8. The method for searching entries in a database as recited in claim 7 wherein said comparing said template entry with said one or more of said plurality of entries includes comparing a value contained by said stored object with a given search parameter identified by a corresponding field of said template entry.

9. The method for search entries in a database as recited in claim 8 wherein said comparing said value contained by said stored object includes comparing whether said value is within a range specified by said given search parameter.

10. The method for searching entries in a database as recited in claim 8 wherein said comparing said value stored by said stored object includes comparing whether said value is identical to a value specified by said given search parameter.

11. The method for searching entries in a database as recited in claim 8 wherein said comparing said template entry with said one or more of said plurality of entries further includes comparing fields of only those entries which are of said particular type or which are a subtype of said particular type with said one or more template entry fields.

12. The method for searching entries in a database as recited in claim 11 wherein said comparing said template entry with said one or more of said plurality of entries includes disregarding a field of said one or more of said plurality of entries that corresponds to a wildcard field of said template entry.

13. The method for searching entries in a database as recited in claim 12 wherein said wildcard field of said template entry is designated using a null value.

14. A computer system with improved searching of object entries, the computer system comprising;

a CPU;

a memory coupled to the CPU, wherein the memory stores a database comprising a plurality of entries, wherein each of said entries comprises a type including a plurality of fields, wherein one or more of said entries comprises sub-types of a type;

wherein the memory stores a search program which is executable by said CPU to compare a template entry specified by a search request with one or more of said plurality of entries, wherein said comparing comprises comparing a plurality of template entry fields in said template entry with fields of said one or more of said plurality of entries, wherein said search program determines if said template entry matches one or more of said plurality of entries in response to said comparing, wherein said determining includes determining if an entry comprising a sub-type matches said template entry, wherein said search program returns a matching entry in said database in response to said determination.

15. A method for searching entries in a database, wherein the database stores a plurality of entries, wherein each of said entries comprises a class type and includes a plurality of typed fields, and wherein at least one entry is a sub-type of a type of another entry, the method comprising:

receiving a query;

comparing said query with one or more of said plurality of entries, wherein said comparing comprises comparing said one or more fields of said query with corresponding fields of said one or more of said plurality of entries;

determining if said query matches one or more of said plurality of entries in response to said comparing, wherein said determining includes determining if an entry comprising a sub-type of said particular type matches said query;

returning a matching entry in said database in response to said determining.

16. A storage medium for use with a database comprising a plurality of entries, wherein each of said entries comprises a type including a plurality of fields, wherein one or more of said entries comprises sub-types of a type, wherein said storage medium stores a search program which is executable by a CPU to compare a template entry specified by a search request with one or more of said plurality of entries, wherein said comparing comprises comparing a plurality of template entry fields in said template entry with fields of said one or more of said plurality of entries, wherein said search program determines if said template entry matches one or more of said plurality of entries in response to said comparing, wherein said determining includes determining if an entry comprising a sub-type matches said template entry, wherein said search program returns a matching entry in said database in response to said determination.

17. The computer system as recited in claim 14 wherein said template entry includes one or more wildcard fields.

18. The computer system as recitaed in claim 17 wherein said one or more wildcard fields are designated using null values.

19. The computer system as recited in claim 14 wherein said template entry is of a particular type, and wherein said comparing said template entry with said one or more of said plurality of entries further includes comparing fields of only those entries which are of said particular type or which are a subtype of said particular type.

20. The computer system as recited in claim 19 wherein said comparing said template entry with said one or more of said plurality of entries includes disregarding a field of said plurality of entries that corresponds to a wildcard field of said template entry.

21. The computer system as recited in claim 20 wherein said wildcard field of said template entry is designated using a null value.

\* \* \* \* \*